United States Patent

[11] 3,598,416

[72] Inventors Frederick Ernest Stock
 Winnipeg, Manitoba, Canada;
 Keith Norman Hitchcock; Geoffrey
 Bernard Thomas, Rugby, England
[21] Appl. No. 871,449
[22] Filed Oct. 10, 1969
[45] Patented Aug. 10, 1971
[73] Assignee The English Electric Company Limited
 London, England
[32] Priority Dec. 21, 1966, Aug. 29, 1969
[33] Great Britain
[31] 57255/66 and 43083/69
 Continuation-in-part of application Ser. No. 692,116, Dec. 20, 1967, now abandoned.

[54] FLEXIBLE BELLOWS ARRANGEMENTS
 10 Claims, 4 Drawing Figs.
[52] U.S. Cl. .................................................... 277/2,
 277/15, 277/34.3
[51] Int. Cl. ...................................................F21b 33/00,
 F16j 9/00, F16j 15/00
[50] Field of Search ..........................................277/2, 34.3,
 34, 15; 137/557; 73/46

[56] References Cited
UNITED STATES PATENTS
| | | | |
|---|---|---|---|
| 2,002,577 | 5/1935 | Ice | 277/2 X |
| 3,141,685 | 7/1964 | Watts | 277/2 X |
| 3,311,029 | 3/1967 | Kimble | 277/34.3 |

Primary Examiner—Samuel Rothberg
Attorneys—Misegades & Douglas, Keith Misegades and George R. Douglas, Jr.

ABSTRACT: In order to detect perforation of a flexible seal provided between two relatively movable members, the seal includes a flexible bellows arrangement comprising a pair of flexible walls defining between them a tubelike enclosure and each extending between the members, and means is provided for feeding a fluid through the enclosure monitoring means being provided for detecting a change in a parameter of the fluid flow whereby to indicate leakage of fluid through one of the walls. The monitoring means may be sensitive to pressure or flow rate.

Where the seal separates two regions at different pressures, the pressure within the enclosure may be an intermediate value. Thus by detecting whether fluid leakage is occurring into or out of the enclosure it is possible to conclude which wall has been perforated.

PATENTED AUG 10 1971  3,598,416

FLEXIBLE BELLOWS ARRANGEMENTS

This application is a continuation-in-part of application 692,116 filed Dec. 20, 1967, and now abandoned.

This invention relates to the detection of perforation of a flexible bellows arrangement providing a seal between relatively movable members.

According to the invention means for detecting perforation of a flexible seal provided between two relatively movable members, includes;

a flexible bellows arrangement comprising a pair of flexible walls each having inner and outer peripheries sealed in a fluid-proof manner to the members, and the walls defining a tubelike enclosure;

fluid-feeding means for feeding a fluid to the enclosure;

outlet means for permitting escape of fluid from the enclosure;

and monitoring means for comparing a parameter of the fluid flow into the enclosure with a parameter of the fluid flow out of the enclosure whereby to detect leakage through, and hence perforation of, a wall.

Where, in use, the seal separates two regions at different pressures, the pressure within the enclosure may be maintained at an intermediate value, whereby, if perforation occurs, to distinguish which wall has been perforated.

The parameter of inlet flow and the parameter of outlet flow which are compared may both be pressure, or alternatively flow rate.

The fluid-feeding means may include means for feeding liquid under a substantially constant pressure. If the fluid is a liquid the fluid-feeding means may include a header tank having means for maintaining therein, in normal operation, a first substantially constant liquid level which the monitoring means is arranged to sense. Alternatively the outlet means may include an outlet tank and means for maintaining therein, in normal operation, a second substantially constant liquid level which the monitoring means is arranged to sense.

Embodiments of the invention will now be described with reference to the accompanying drawings, of which:

Figure 1:
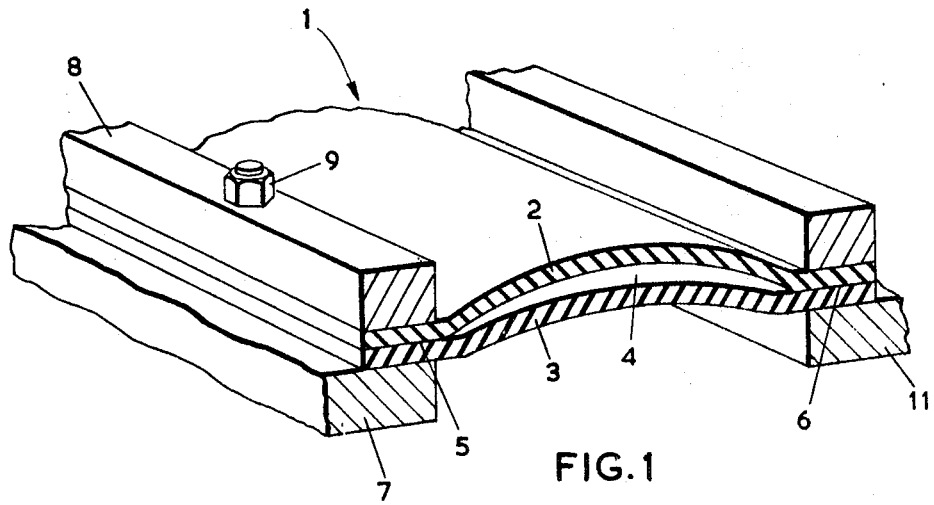
FIG. 1 is a fragmentary sectional perspective view of a first flexible bellows arrangement attached to two relatively movable members.

Referring to FIG. 1 of the drawings, the bellows arrangement 1 comprises two walls 2, 3 of reinforced rubber or like fluidproof flexible material, which walls are of equal width and are curved over a central portion of their width. The radius of curvature of the wall 2 is less than that of the wall 3 and the walls are sandwiched together to bring them into sealing engagement along their edges to provide a generally crescent-shaped passage 4 and a pair of external flanges 5 and 6. The flange 5 is sealed to a member 7 by any suitable means; in this case by a metal clamping strip 8 and a stud and nut arrangement 9; and the flange 6 is similarly sealed to a member 11.

The members 7 and 11 are capable of a limited relative movement, and thus the bellows 1 provides a seal for the space between the two members without significantly affecting their relative movement and maintains this seal if one of the walls 2, 3 of the bellows fails.

Figure 2:
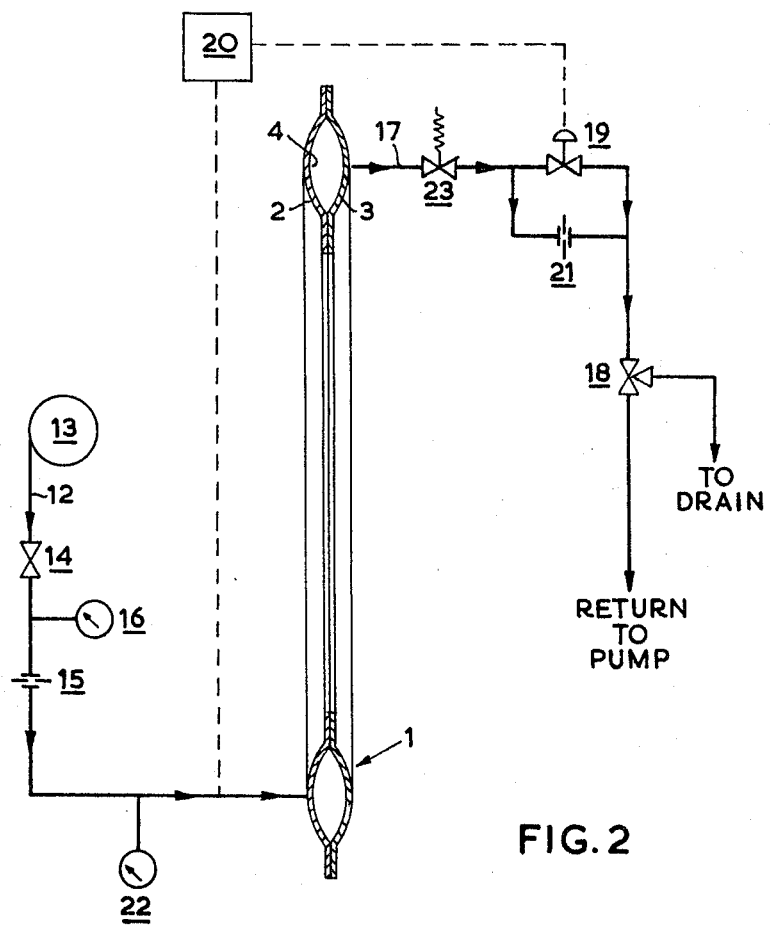
FIG. 2 is a section through a second flexible bellows arrangement included in a circuit diagram which shows a pressure sensitive monitoring system.

In a second of the bellows arrangement 1 the radius of curvature of the walls may be equal, and the walls may be arranged face to face so as to provide an oval cross section as shown in FIG. 2 of the drawings.

Referring now to FIG. 2 of the drawings, water is introduced into the passage 4 of the bellows 1 via a line 12 including a pump 13, an isolating valve 14 and an orifice 15. The pressure upstream of the orifice 15 is monitored by a pressure gauge 16 so as to provide an indication of the operating condition of the isolating valve 14. A return line 17 leads from the passage 4 to a three-way valve 18 which can be set to return the water to the pump 13 or to a drain. The return line 17 includes means for maintaining the water in the passage 4 at a controlled pressure level, said means comprising a pressure-regulating valve 19 linked to a pressure level control device 20 which in turn is linked with the inlet line 12. The device 20 is a proportional integral and derivative controller capable of being tuned for stable pressure level control. Such devices are well known and are obtainable from several manufacturers. A bypass orifice 21 is provided in parallel with valve 19 for ensuring that the latter may control the water pressure in the passage 4 only within fine limits, e.g. to eliminate any changes of pressure which might arise due to temperature changes of the water. The valve 19 thus cannot compensate for any significant changes of pressure occurring in the passage 4 due to a failure of the bellows wall. The means for detecting these significant changes of water pressure comprises a pressure gauge 22 having an alarm contact (not shown) associated therewith which is provided in the inlet line 12 between the orifice 15 and the connection to the passage 4 of the bellows. A relief valve 23 is included in the return line 17 for preventing water pressure buildup in the passage 4 in the event of an obstruction occurring in the bellows arrangement circuit.

In use the water in the passage 4 is maintained at a controlled pressure level which is different from the level of the pressure or pressures normally present on the two sides of the bellows by the regulating valve 19 and control device 20, and any significant changes in pressure in the passage are detected by the pressure gauge 22 indicating that one of the walls 2, 3 of the bellows has failed.

Where there is a pressure differential between the two sides of the bellows, the water pressure level in the passage 4 may be maintained above the level of the higher pressure, or below the level of the lower pressure, and failure of one of the walls 2, 3 will be indicated by a rise or fall in the pressure level as the case may be. Alternatively, the water in the passage 4 may be maintained at a pressure level intermediate that of the pressure levels on the two sides of the bellows 1 so that an indication of which wall 2, 3 has failed will be given by the manner in which the fluid pressure level in said passage changes.

Figure 3:
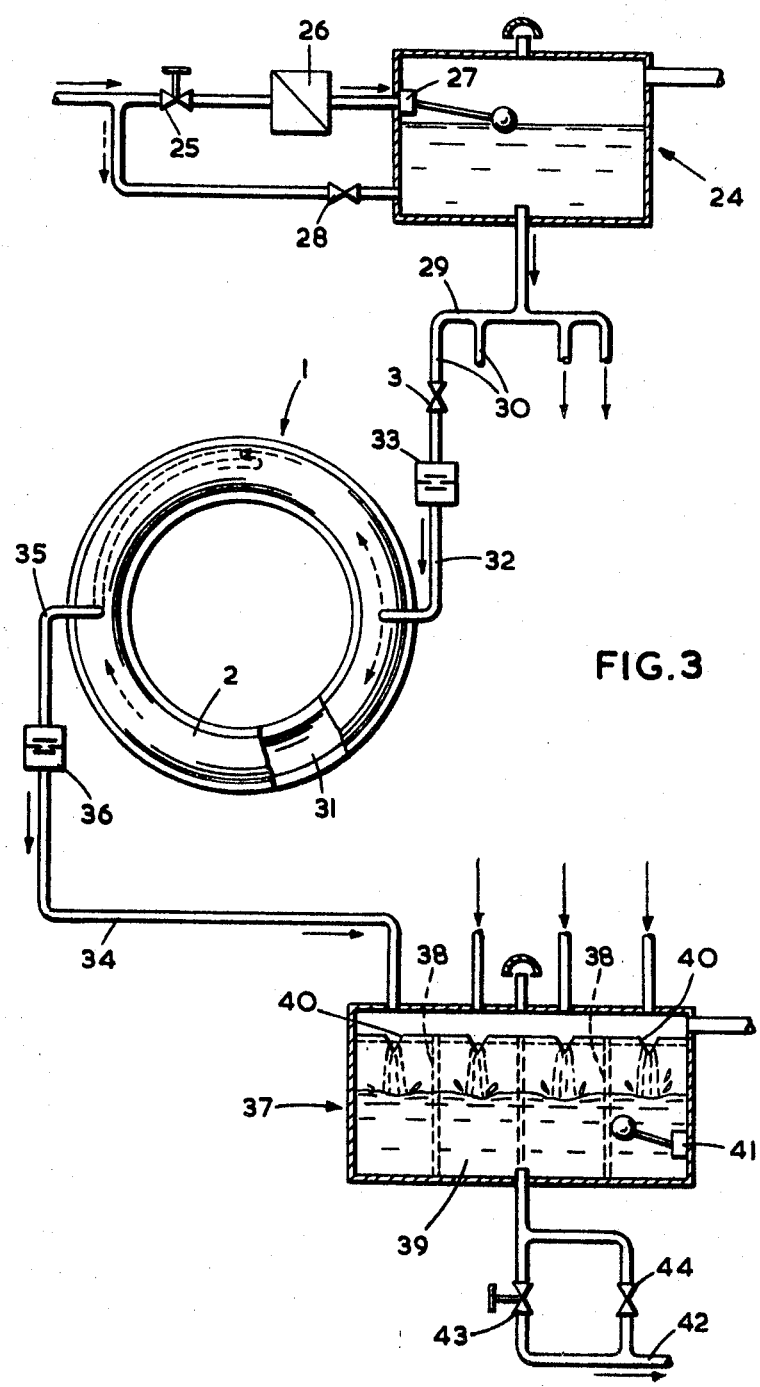
FIG. 3 is a circuit diagram showing the second flexible bellows arrangement and a first flow rate sensitive monitoring system.

Referring to FIG. 3, there is shown, situated above a bellows arrangement 1, a vented header tank 24 which is connected to a source of water supply. If, for example, the embodiment is installed in steam turbine plant, the source may conveniently be a condensate extraction pump (not shown). Interposed between the source and the tank 24 is a stop valve 25, a strainer 26, and a float operated ball valve 27. A further connection between the source and the tank includes a bypass valve 28 for a purpose to be explained later.

An outlet rail 29 is provided beneath the tank 24 from which connections 30 extend to a number of bellows 1. Each connection includes an isolating valve 31 and a flexible portion 32. Under certain circumstances discussed below, an inlet orifice or restrictor 33 may be interposed between the rail 29 and each bellows 1.

A drain 34 leads from the top of the bellows 1 and includes a flexible portion 35 and an outlet orifice 36. The drain 34 communicates with a vented tank 37 which comprises two chambers, the upper of which is subdivided into drain control chambers 38, there being one for each bellows, and the lower of which comprises a low level alarm tank 39. One wall of each drain control chamber 38 defines a "Vee" notch 40, and the low level alarm tank 39 contains a float operated alarm switch 41.

From the bottom of the low level alarm chamber 39, a further drain 42 leads to an atmospheric clear drain tank (not shown). The drain 42 includes an adjustable needle valve 43, connected in parallel with which is a low level alarm test valve 44.

In operation of the embodiment the stop valve 25 is open and water is fed to the header tank 24, the water level therein being maintained by the float operated ball valve 27. For each bellows in normal operation the respective isolating valve 31 is open and water is passed therethrough to the bellows 1, and being drained to the respective drain control chamber 37 via outlet orifice 36. Provided that the header tank water level and hence the bellows inlet pressure head remains constant, the orifice 36 will maintain a constant water discharge flow rate to the respective drain control chamber 38. Should the ball valve 27 fail, the stop valve 25 may be closed and the bypass valve 28 be manually opened and controlled so as to maintain tank water level whilst the ball valve is repaired or replaced. In certain circumstances, plant layout may result in the header tank 24 being at such a height above the bellows inlet that the inlet pressure head be greater than that desired. In such a case inlet orifice 33 may be employed to reduce the bellows inlet pressure.

From the drain control chamber 38, water may flow over the "Vee" notch 40 into the low level alarm chamber 39. The needle valve is adjusted such that water outflow from the chamber 39 equals the total water flow over the "Vee" notches 40. The water level in chamber 39 will thus remain constant.

The bellows inlet pressure is selected such that it is higher than any operating pressure external to the bellows. Thus should either wall of the bellows fail, water will escape therefrom, and the flow rate into the respective drain control chamber 38 will drop. As a result the water level in the chamber 39 will fall, and the alarm switch 41 will cause an audible and/or visual warning to be given to the plant operator.

By inspecting the tank 37 and observing over which "Vee" notch the flow rate has decreased, the operator may learn which bellows has suffered a wall failure. He may then close the appropriate valve 31 to isolate the defective bellows, and reset the needle valve 43 to maintain the low level alarm chamber water level. Because only one wall of the defective bellows has failed, the seal will be maintained by the undamaged wall, and there is thus no need to shut the plant down. Bellows replacement may await a routine plant shutdown.

The low level alarm switch 41 may be tested during plant running by temporarily opening the test valve 44.

Figure 4:
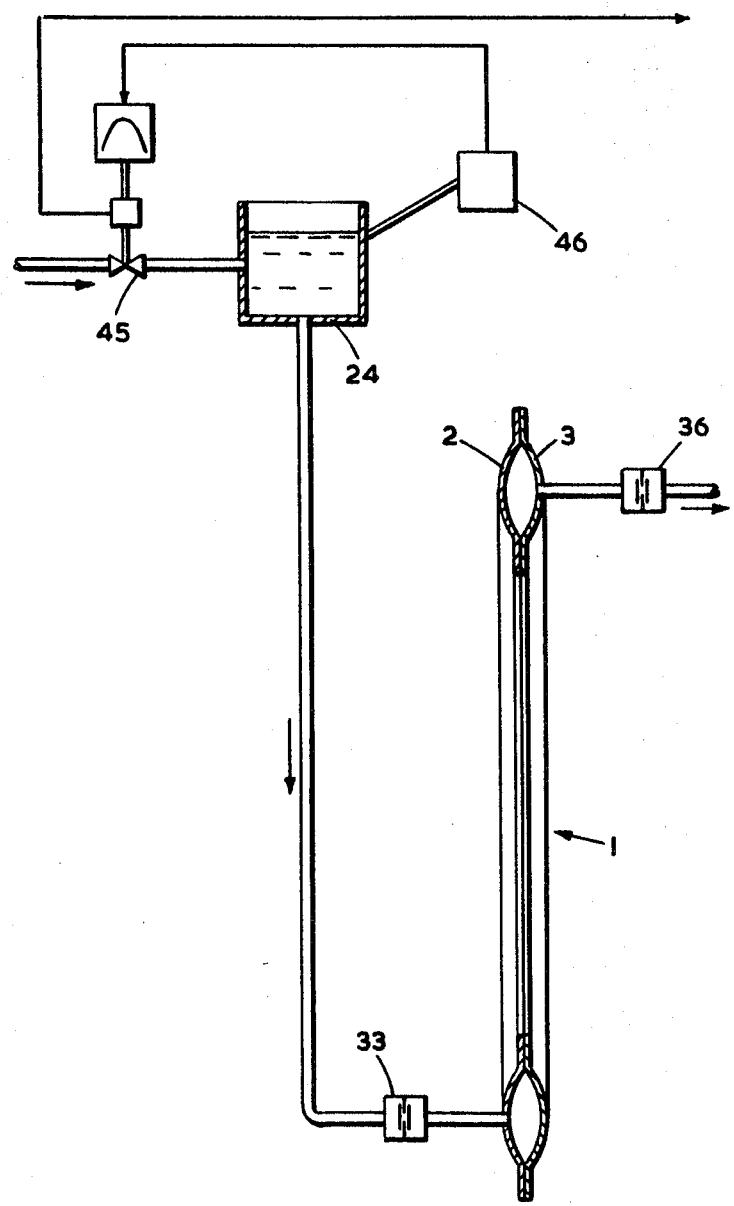
FIG. 4 is a circuit diagram showing the second flexible bellows arrangement and a second flow rate sensitive monitoring system.

Referring finally to FIG. 4, an adjustable control valve 45 is interposed between a source of water (not shown) and a header tank 24. The control valve 45 is a motor-controlled fine needle valve and the motor is connected to a controller 46 responsive to header tank water level. The bottom of the header tank 24 is connected to the bellows inlet. As with the first embodiment, an orifice 33 may be provided for reducing the bellows inlet pressure. The bellows outlet leads via an outlet orifice 36 to an atmospheric drain tank (not shown).

In operation of the embodiment, the flow rate through the valve 45 may be increased or decreased, within small limits, in response to level fluctuation in the header tank 24. However, the arrangement is such that if failure of a bellows wall occurs, the consequent opening of the valve in attempting to compensate for the increased water drain rate from the tank 24 will exceed the small limits mentioned above and will trigger an alarm.

It will also be appreciated that the valve 45 could alternatively be controlled by, for example, pneumatic means.

It will also be appreciated that if the bellows arrangement is required to be used under temperature conditions which might have a deleterious effect on the material of the bellows, the fluid introduced into the bellows may conveniently be used to cool the bellows.

It will also be appreciated that the bellows may be of any suitable shape along its length to suit the space which is required to be sealed. Thus, for example, if the bellows is required to seal an annular space, the bellows would be generally in the form of a ring. If this is the case the bellows may be formed in segments which are joined together to form the ring. The segments may conveniently be joined together by a fluidproof zip fastener arrangement similar to that used for divers' suits.

It will be further appreciated that the bellows arrangement may conveniently be used in the condensing steam turbine plant described in the specification of our U.S. Pat. No. 3,447,320. In that specification there is described condensing steam turbine plant in which a chamber encloses each low pressure turbine from which steam is to be exhausted and the chamber houses condenser means for the steam which are disposed radially around the turbine casing, means being provided for deflecting the steam into the chamber and hence into the condensing means. The chamber and the turbine are separate from each other and are separately supported to permit relative movement therebetween and thus a flexible bellows is required between the chamber and the turbine structure to prevent the exhaust steam escaping to atmosphere.

We claim:

1. Means for detecting perforation of a flexible seal provided between two relatively movable members, including;
   a flexible bellows arrangement comprising a pair of flexible walls each having inner and outer peripheries sealed in a fluidproof manner to the members, and the walls defining a tubelike enclosure;
   fluid-feeding means for feeding a fluid to the enclosure;
   outlet means for permitting escape of fluid from the enclosure;
   and monitoring means for comparing a parameter of the fluid flow into the enclosure with a parameter of the fluid flow out of the enclosure whereby to detect leakage through, and hence perforation of, a wall.

2. Perforation detection means according to claim 1, for use where the seal separates two regions at different pressures, wherein the pressure within the enclosure is maintained at an intermediate value whereby, if perforation occurs, to distinguish which wall has been perforated.

3. Perforation detection means according to claim 1, wherein the compared parameter of fluid flow into the enclosure is pressure and the compared parameter of fluid flow out of the enclosure is pressure.

4. Perforation detection means according to claim 1, wherein the compared parameter of fluid flow into the enclosure is flow rate and the compared parameter of fluid flow out of the enclosure is flow rate.

5. Perforation detection means according to claim 4, wherein the fluid-feeding means includes means for feeding fluid under a substantially constant pressure.

6. Perforation detection means according to claim 5, wherein the fluid is a liquid and the fluid-feeding means includes a header tank having means for maintaining therein, in normal operation, a first substantially constant liquid level.

7. Perforation detection means according to claim 6, wherein the monitoring means is arranged to sense the first liquid level.

8. Perforation detection means according to claim 7, wherein the outlet means includes an outlet tank and means for maintaining therein, in normal operation, a second substantially constant liquid level, and the monitoring means is arranged to sense the second liquid level.

9. A flexible bellows arrangement for sealing a space between two relatively movable members, including a bellows of tubular form having a pair of external flanges extending along the length thereof for attachment one to each of said members, wherein the improvement comprises means for detecting failure of a wall of the bellows, said means including means for feeding a fluid under pressure to the bellows, outlet means for permitting escape of said fluid from the bellows at a rate such that said pressure is maintained at a level different from that normally obtaining on either side of the bellows, and pressure-sensitive means for detecting a change in the fluid pressure whereby to indicate a failure of said wall.

10. An arrangement according to claim 9, for use where a pressure difference normally exists between the two sides of the bellows, wherein said fluid pressure is maintained at a level intermediate the pressures on either side of the bellows.